Patented May 21, 1946

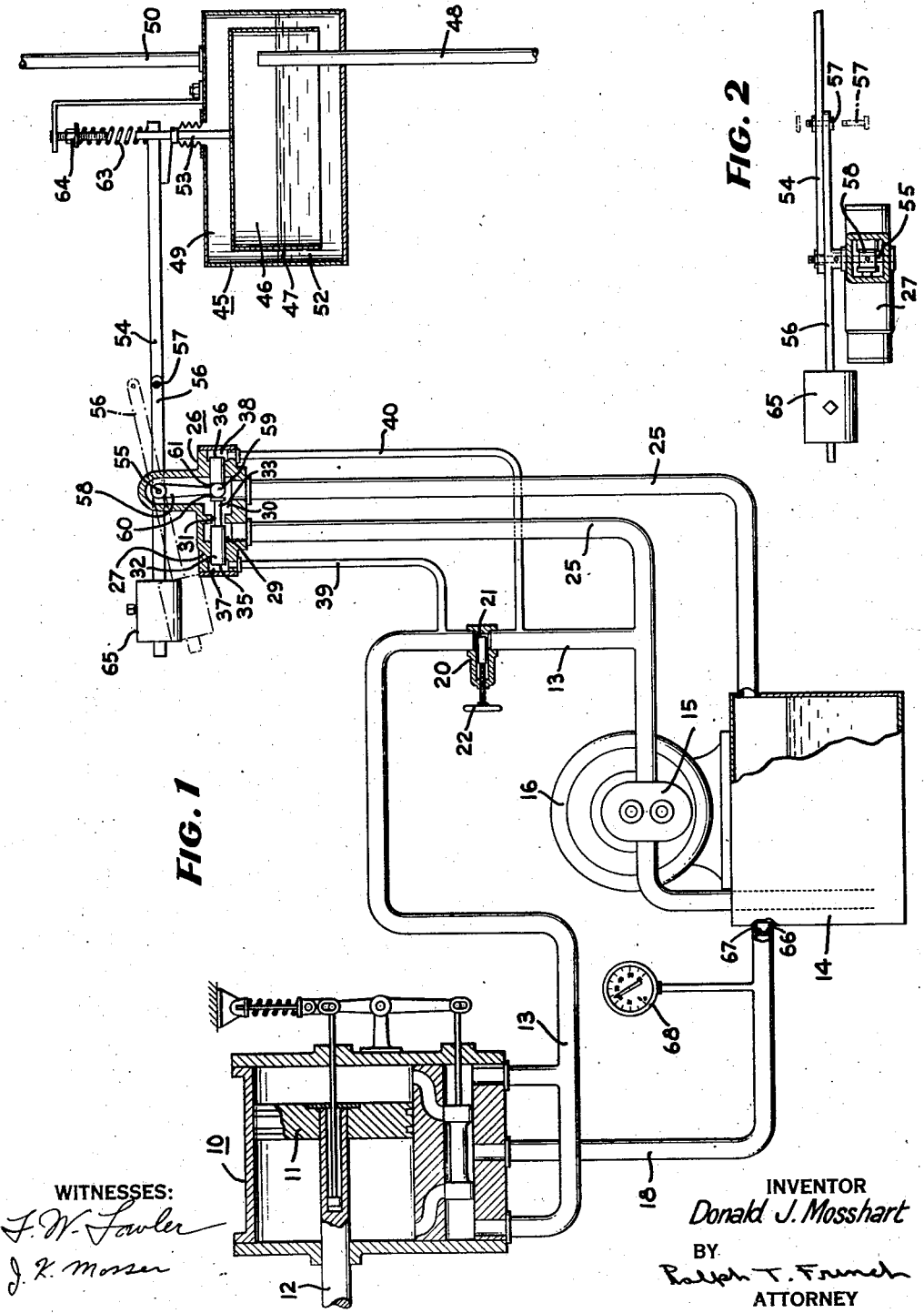

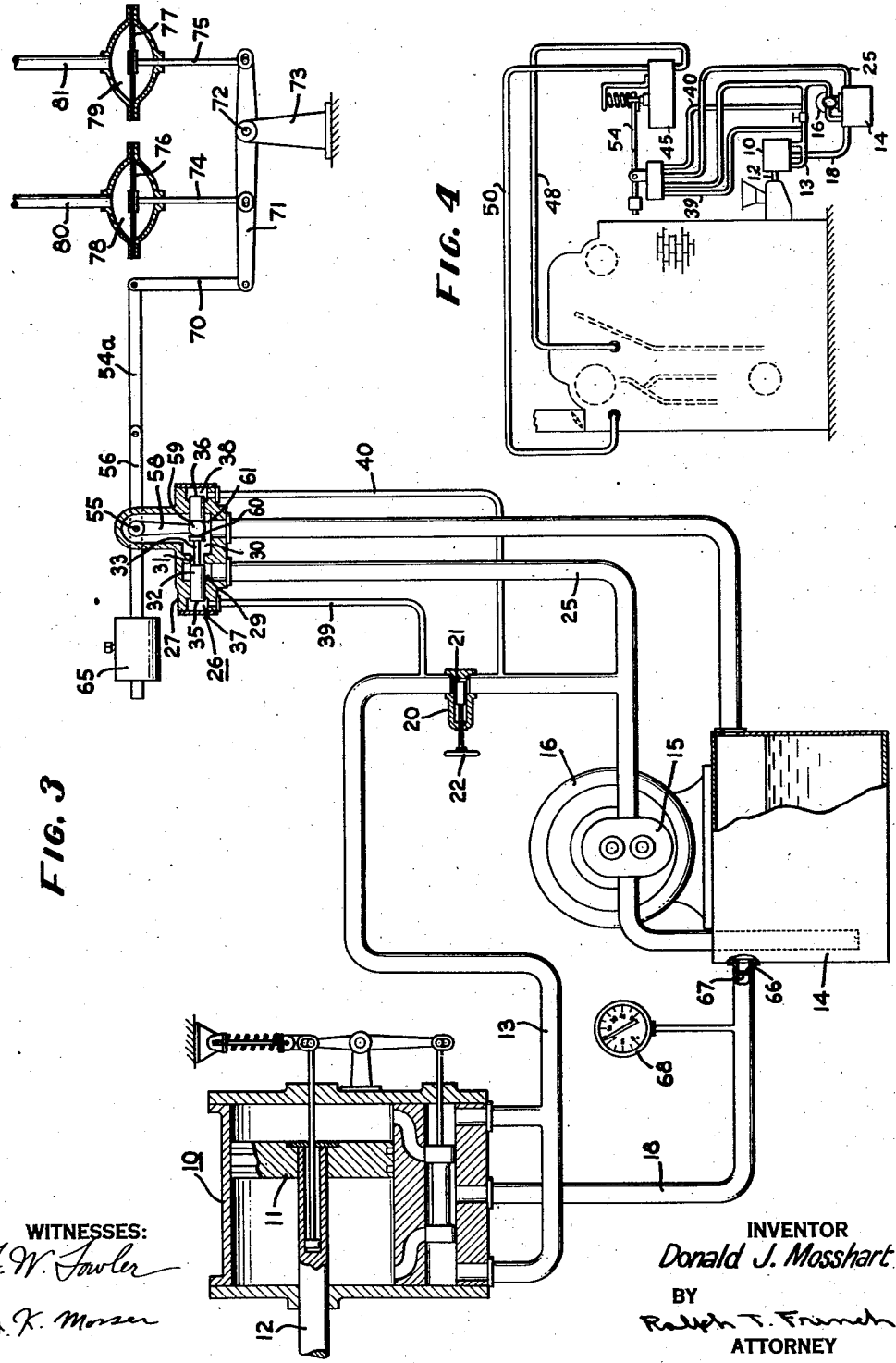

2,400,706

UNITED STATES PATENT OFFICE 2,400,706

STOKER APPARATUS

Donald J. Mosshart, Ardmore, Pa., assignor to Westinghouse Electric Corporation, East Pittsburgh, Pa., a corporation of Pennsylvania Application October 7, 1943, Serial No. 505,302

10 Claims. (Cl. 236—15)

This invention relates to furnace controls, more particularly to means for automatically controlling the feed of fuel to the furnace, and has for an object to provide improved apparatus of this character.

Another object of the invention is to provide novel means for maintaining a predetermined ratio of rate of feed of fuel to a furnace to rate of flow of air thereto.

Yet another object of the invention is to provide novel means for varying the rate of feed of fuel to a stoker-fired boiler installation in response to changes in an operating characteristic of the boiler installation.

A further object of the invention is to provide improved means for increasing or decreasing the rate of feed of fuel to a furnace in response to a similar change in the rate of flow of air to the furnace.

These and other objects are effected by the invention as will be apparent from the following description and claims taken in connection with the accompanying drawings, forming a part of this application, in which:

Fig. 1 is a schematic view, partially in section, of one form of apparatus for carrying out the present invention;

Fig. 2 is a plan view of a portion of the structure shown in Fig. 1;

Fig. 3 is a view, similar to Fig. 1, of a second form of apparatus; and,

Fig. 4 is a diagrammatic view showing the apparatus applied to a boiler installation.

Referring now to the drawings more in detail, and particularly to Fig. 1, the reference character 10 indicates a fluid engine whose speed is directly proportional to the amount of fluid supplied thereto, and whose piston 11 reciprocates the piston shaft 12, to drive suitable fuel-feeding mechanism (not shown), for continuously feeding fuel to a furnace. Motive fluid is supplied to the engine 10 through the main conduit 13, from a reservoir 14, by suitable constant volume means, such as the gear pump 15, driven by the motor 16. A conduit 18 provides for return of discharged fluid from the engine 10 to the reservoir 14, in a well-known manner.

A valve 20 is positioned in the main conduit 13, between the pump 15 and the engine 10, and provides a metering orifice 21, whose cross-sectional area may be adjusted manually, by the handwheel 22. A branch conduit 25 serves to by-pass fluid from the main conduit 13, at the upstream side of the metering orifice 21, to the reservoir 14.

Valve means 26 is provided in the branch conduit 25 for controlling the by-passing of fluid therethrough to the reservoir. By controlling the amount of fluid by-passed from the main conduit to the reservoir, the valve means 26 also controls the flow of fluid through the metering orifice 21, to vary the speed of the engine 10.

The valve means 26 includes a casing 27 having inlet and outlet chambers 29 and 30, respectively, in communication with the two sections of the by-pass conduit 25 leading thereto and therefrom. The inlet and outlet chambers 29 and 30 are connected by a port 31, flow of fluid therethrough being controlled by the cylindrical portion 32 of the valve 33, which is mounted in the casing 27 for longitudinal reciprocation. This valve 33 is provided at its opposite ends with piston faces 35 and 36, disposed in chambers 37 and 38, respectively. A pressure line 39 places the chamber 37 in communication with the main conduit 13 at the downstream side of the orifice 21 and a similar pressure line 40 provides communication between the chamber 38 and the main conduit at the upstream side of the orifice. It will be obvious that the pressure differential existing between the upstream and downstream sides of the orifice 21 will provide a force acting on the valve 33 tending to move the latter toward opening position of the port 31.

Suitable gas pressure measuring means, such as the bell-type gasometer 45, is provided. In this device, the space 46, within the bell 47, receives and is subject to the gas pressure existing within the furnace, or the gas passages of the boiler served by the furnace, at a predetermined point therein. The space 49 outside of the bell 47 is subject, through the conduit 50, to the gas pressure existing within the furnace, or the gas passages of the boiler served thereby, at a point farther along in the gas flow path therethrough. Obviously, any change in the difference between the pressures existing at these two points will effect operation of the gasometer, to raise or lower the bell 47 thereof, the space 46 within the bell being sealed from the space 49 surrounding the same by a liquid seal, at 52, in a well-known manner.

Vertical movement of the bell 47 operates through the rod 53, extending upwardly therefrom, to raise and lower the righthand end of the bar 54, whose lefthand end freely receives the horizontal shaft 55, mounted on and extending through a portion of the valve casing 27. A second bar 56 is fixedly secured, intermediate its ends, to the shaft 55, and has its righthand end detachably secured to the bar 54, by suitable means such as the pin 57. Thus, with the pin 57 connecting the bars 54 and 56, the two bars operate as one, and vertical movement of the gasometer bell 47 imparts rotation to the horizontal shaft 55.

A crank 58 is fixedly secured on the shaft 55 within the casing 27 and has its free end 59 connected to the valve 33, between opposed abutments 60 and 61 on the valve.

It will be apparent that upon a change in the differential pressure existing between the two selected points in the gas flow path through the furnace or its boiler, a force will be transmitted to the valve 33 tending to move it longitudinally, and this force is either supplemented or counteracted by the force applied to the valve by the pressure differential existing at the opposite sides of the orifice 21, in the main conduit 13. Adjustment of the force imparted to the valve 33, by the gasometer 45, may be secured by means of the spring 63 and adjusting nut 64, carried by the upper threaded portion of the rod 53.

A weight 65 is longitudinally adjustable on the lefthand end of the bar 56, and serves to balance the weight of the gasometer bell 47 and its integrally associated parts. With the weight 65 and pin 57 removed from the ends of the bar 56, the latter may be operated manually, or a predetermined force may be applied by the use of weights on the bar.

In operation, assuming that the amount of air supplied to the furnace is increased by conventional control means, in response to a demand for increased load on the boiler, the pressure differential within the gasometer will be increased, resulting in upward movement of the bell 47, which will impose on the valve 33 a force moving the latter toward closing position of the port 31. Closing of this port will decrease the amount of fluid by-passed to the reservoir 14 and correspondingly increase the amount forced through the orifice 21, this increase in fluid supplied to the engine 10 resulting in a corresponding increase in the speed thereof and hence an increase in the amount of fuel fed to the furnace. At the same time that the amount of fluid flowing through the orifice 21 is increased, the pressure differential existing at opposite sides of this orifice will likewise be increased, this increase in pressure differential exerting an increased force on the valve 33 tending to counteract the force applied thereto by the gasometer. This force resulting from the pressure differential at opposite sides of the orifice will increase until it is sufficient to balance the force of the gasometer, at which time the valve 33 will be stabilized at a new position, providing for an increased rate of flow of fluid to the engine 10, and a corresponding increased rate of feed of fuel to the furnace, corresponding to the new and increased rate of flow of air to the furnace. Obviously, a decrease in the amount of air supplied to the furnace will provide for a corresponding decrease in the speed of the engine 10 and in the rate of feed of fuel thereby to the furnace.

The gas pressure differential imposed on the gasometer varies as the square of the rate of flow of gas through the furnace and boiler, and hence as the square of the rate of flow of air thereto. Likewise, the differential in fluid pressure at the opposite sides of the orifice 21, and at the opposite ends of the piston 33, varies as the square of the rate of flow of fluid through the metering orifice 21 and hence as the square of the speed of the engine. Therefore, the net forces, fluid pressure on the valve and that exerted on the valve by the gasometer, both vary as the square of quantities which are to be maintained in direct ratio. The ratio of these forces is fixed by the proportions of the bar 54 and crank 56.

If desired, a dam 66 having a fixed orifice 67 may be provided in the return conduit 18 between the engine and the reservoir, and a pressure gauge 68 positioned at the upstream side of this dam. Inasmuch as the pressure at the downstream side of the dam is constant (atmospheric), the pressure gauge may be used to indicate the flow of fluid through the engine, thus indicating the speed thereof and the rate of feed of fuel to the furnace.

In Fig. 3 there is shown a modification, differing from that of Fig. 1 in the means for imparting motion to the bar 54a. Vertical motion is imparted to the righthand end of this bar through the connecting link 70, operated by the tiltable link 71 pivotally mounted, as at 72, to a fixed support 73. Tilting movement is imparted to the link 71 by rods 74 and 75 connected to diaphragms 76 and 77, respectively. The diaphragms 76 and 77 each constitute a wall of chambers 78 and 79 respectively, to which pressure is admitted through conduits 80 and 81, respectively. These conduits are in communication with the path of steam flow from the boiler at spaced points therealong, with the result that the pressures within the chambers 78 and 79 differ to an extent corresponding to the pressure drop in the steam flow between the points at which the conduits 80 and 81 are connected to the steam flow path.

It will be apparent that, in this modification, a change in the rate of flow of steam from the boiler will exert a force on the valve 33, tending to produce a change in the size of the port 31. This change produces a corresponding change in the rate of flow of fluid in the engine 10.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. Combustion control apparatus for a stoker-fired boiler installation comprising a fluid engine whose speed is directly proportional to the flow of fluid thereto, a fluid reservoir, a constant volume pump for supplying fluid under pressure from said reservoir to the engine, a main conduit for flow of fluid from said pump to said engine, means providing a metering orifice in said conduit, a branch conduit for by-passing fluid from the main conduit at the upstream side of the metering orifice to the fluid reservoir, and valve means to control flow of fluid through said branch conduit, said valve means being responsive to pressure differential in the main conduit at opposite sides of the metering orifice and to an operating characteristic of the boiler installation.

2. Combustion control apparatus for a stoker-fired boiler installation comprising a fluid engine whose speed is directly proportional to the flow of fluid thereto, a fluid reservoir, a constant volume pump for supplying fluid under pressure from said reservoir to the engine, a main conduit for flow of fluid from said pump to said engine, means providing a metering orifice in said conduit, a branch conduit for by-passing fluid from the main conduit at the upstream side of the metering orifice to the fluid reservoir, and valve means to control flow of fluid through said branch conduit, said valve means being responsive to pressure differential in the main conduit at opposite sides of the metering orifice and to pressure differential between two selected points in the path of steam flow from the boiler installation.

3. Combustion control apparatus for a stoker-fired boiler installation comprising a fluid engine whose speed is directly proportional to the flow of fluid thereto; a fluid reservoir; a constant volume pump for supplying fluid under pressure from the reservoir to the engine; a main conduit for flow of fluid from the pump to the engine; means providing an adjustable metering orifice in said conduit; a branch conduit for by-passing fluid from the main conduit at the upstream side of the metering orifice to the reservoir; and valve means for controlling flow of fluid through said branch conduit, said valve means including a piston valve having opposed piston faces at opposite ends, means for applying to one of said piston faces the pressure existing in the main conduit at the upstream side of the orifice, means for applying to the other of said piston faces the pressure existing in the main conduit at the downstream side of the orifice, whereby the pressure existing at opposite sides of the orifice effects the position of the valve controlling by-passing of fluid to the reservoir, and means for applying to said valve a force responsive to a change in an operating characteristic of the boiler installation.

4. Combustion control apparatus for a stoker-fired boiler installation comprising a fluid engine whose speed is directly proportional to the flow of fluid thereto; a fluid reservoir; a constant volume pump for supplying fluid under pressure from the reservoir to the engine; a main conduit for flow of fluid from the pump to the engine; means providing an adjustable metering orifice in said conduit; a branch conduit for by-passing fluid from the main conduit at the upstream side of the metering orifice to the reservoir; and valve means for controlling flow of fluid through said branch conduit, said valve means including a piston valve having opposed piston faces at opposite ends, means for applying to one of said piston faces the pressure existing in the main conduit at the upstream side of the orifice, means for applying to the other of said piston faces the pressure existing in the main conduit at the downstream side of the orifice, whereby the pressure existing at opposite sides of the orifice effects the position of the valve controlling by-passing of fluid to the reservoir, and means for applying to said valve a force responsive to change in rate of flow of steam from the boiler installation.

5. Stoker combustion control apparatus comprising a fluid engine whose speed is directly proportional to the flow of fluid thereto, a fluid reservoir, a constant volume pump for supplying fluid under pressure from said reservoir to the engine, a main conduit for flow of fluid from said pump to said engine, means providing a metering orifice in said conduit, a branch conduit for by-passing fluid from the main conduit at the upstream side of the metering orifice to the fluid reservoir, and valve means to control flow of fluid through said branch conduit, said valve means being responsive to pressure differential in the main conduit at opposite sides of the metering orifice and to pressure differential between two selected points in the path of gas flow through a furnace served by the stoker.

6. In apparatus for maintaining a predetermined ratio of rate of feed of fuel to a stoker to rate of flow of air thereto: a fluid engine whose speed is directly proportional to the flow of fluid thereto; a fluid reservoir; a constant volume pump for supplying fluid under pressure from the reservoir to the engine; a main conduit for flow of fluid from the pump to the engine; means providing an adjustable metering orifice in said conduit; a branch conduit for by-passing fluid from the main conduit at the upstream side of the metering orifice to the reservoir; and valve means for controlling flow of fluid through said branch conduit, said valve means including a piston valve having opposed piston faces at opposite ends, means for applying to one of said piston faces the pressure existing in the main conduit at the upstream side of the orifice, means for applying to the other of said piston faces the pressure existing in the main conduit at the downstream side of the orifice, whereby the pressure existing at opposite sides of the orifice effects the position of the valve controlling by-passing of fluid to the reservoir, and means for applying to said valve a force responsive to change in rate of flow of air to the stoker.

7. In apparatus for maintaining a predetermined ratio of rate of feed of fuel to a furnace to rate of flow of air thereto: a fluid engine whose speed is directly proportional to the flow of fluid thereto; a fluid reservoir; a constant volume pump for supplying fluid under pressure from the reservoir to the engine; a main conduit for flow of fluid from the pump to the engine; means providing an adjustable orifice in said conduit; a branch conduit for by-passing fluid from the main conduit at the upstream side of the orifice to the reservoir; a valve for controlling flow of fluid through said branch conduit; means for applying to said valve a force tending to close the same in response to increase in rate of flow of air to the furnace and tending to open the valve in response to decrease in rate of flow of air to the furnace; and means responsive to change in fluid pressure difference in the main conduit at opposite sides of the orifice for applying to the valve a force tending to counteract the force applied in response to change in rate of flow of air to the furnace.

8. In apparatus for maintaining a predetermined ratio of rate of feed of fuel to a furnace to rate of flow of air thereto: a fluid engine whose speed is directly proportional to the flow of fluid thereto; a fluid reservoir; a constant volume pump for supplying fluid under pressure from the reservoir to the engine; a main conduit for flow of fluid from the pump to the engine; means providing an adjustable orifice in said conduit; a branch conduit for by-passing fluid from the main conduit at the upstream side of the orifice to the reservoir; a valve for controlling flow of fluid through said branch conduit, thereby controlling flow of fluid to the engine; and means responsive to change in rate of flow of liquid to the engine for applying to the valve a force tending to counteract the force applied in response to change in rate of flow of air to the furnace.

9. In apparatus for maintaining a predetermined ratio of rate of feed of fuel to a furnace to rate of flow of air thereto: a fluid engine whose speed is directly proportional to the flow of fluid thereto; a fluid reservoir; a constant volume pump for supplying fluid under pressure from the reservoir to the engine; a main conduit for flow of fluid from the pump to the engine; means providing an adjustable orifice in said conduit; a branch conduit for by-passing fluid from the main conduit at the upstream side of the orifice to the reservoir; valve means for controlling flow of fluid through said branch conduit thereby controlling flow of fluid to the engine, said valve means comprising a valve casing, a valve member slidable within said casing and having opposed piston faces at opposite ends, each of said faces cooperating with the casing to provide a pair of fluid chambers; means placing one of said chambers in communication with the interior of the main conduit at one side of the orifice and means placing the other of said chambers in communication with the interior of the main conduit at one side of the orifice, whereby the pressure differential existing in the main conduit at opposite sides of the orifice exerts a force on the valve tending to move it to open position; linkage connected to said valve and adapted to exert thereon, in response to change in rate of flow of air to the furnace, a force opposing the aforementioned force resulting from the pressure differential existing in the main conduit at opposite sides of the orifice.

10. In apparatus for maintaining a predetermined ratio of rate of feed of fuel to a boiler furnace to rate of flow of air thereto: a fluid engine whose speed is directly proportional to the flow of fluid thereto; a fluid reservoir; a constant volume pump for supplying fluid under pressure from the reservoir to the engine; a main conduit for flow of fluid from the pump to the engine; means providing an adjustable orifice in said conduit; a branch conduit for by-passing fluid from the main conduit at the upstream side of the orifice to the reservoir; a valve for controlling flow of fluid through said branch conduit, thereby controlling flow of fluid to the engine; a gasometer adapted to receive and react to the difference in gas pressure existing between two selected points in the furnace; means for transmitting to the valve a first force resulting from reaction of the gasometer, said gasometer and force-transmitting means moving the valve towards closed position upon increase in pressure differential acting on the gasometer in response to increased flow of air to the furnace; means for applying to the valve a second force responsive to the fluid pressure differential existing in the main conduit at opposite sides of the orifice, said second force acting on the valve in opposition to the first force transmitted thereto from the gasometer, and said second force increasing upon increase in flow of fluid through the orifice due to movement of the by-pass valve towards closed position by action of the gasometer, said second force increasing until it balances the first force received from the gasometer.

DONALD J. MOSSHART.